(12) United States Patent
Zhang et al.

(10) Patent No.: US 12,269,137 B2
(45) Date of Patent: Apr. 8, 2025

(54) SYSTEM AND METHOD FOR REAL-TIME MONITORING AND PREDICTING WEAR OF A CUTTING TOOL

(71) Applicant: Kennametal Inc., Latrobe, PA (US)

(72) Inventors: Shuangyuan Zhang, Singapore (SG); Christoph Gey, Stetten (CH); Patrick Kuhlemann, Fuerth (DE); Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 238 days.

(21) Appl. No.: 17/894,800

(22) Filed: Aug. 24, 2022

(65) Prior Publication Data

US 2024/0066653 A1 Feb. 29, 2024

(51) Int. Cl.
*G06N 20/00* (2019.01)
*B23Q 17/09* (2006.01)

(52) U.S. Cl.
CPC ......... *B23Q 17/0995* (2013.01); *G06N 20/00* (2019.01)

(58) Field of Classification Search
CPC .............................. G06N 20/00; B23Q 17/0995
See application file for complete search history.

(56) References Cited

U.S. PATENT DOCUMENTS

| | | |
|---|---|---|
| 4,744,242 A | 5/1988 | Anderson et al. |
| 5,275,633 A | 1/1994 | Silver et al. |
| 2006/0085092 A1 | 4/2006 | Lange et al. |
| 2009/0234490 A1 | 9/2009 | Suprock et al. |
| 2011/0169651 A1 | 7/2011 | Mitchell et al. |
| 2013/0304248 A1 | 11/2013 | Bonas et al. |
| 2014/0140781 A1 | 5/2014 | Eriksson et al. |
| 2015/0261207 A1 | 9/2015 | Wunderlich et al. |
| 2016/0144473 A1 | 5/2016 | Fronius et al. |
| 2016/0290906 A1 | 10/2016 | Rancic et al. |

(Continued)

FOREIGN PATENT DOCUMENTS

| | | |
|---|---|---|
| CN | 104656555 A | 5/2015 |
| CN | 207138888 U | 3/2018 |

(Continued)

OTHER PUBLICATIONS

"Multicomponent Dynamometer", Type 9129AA, Kistler Group, Switzerland, 2018, 5 pages.

(Continued)

*Primary Examiner* — Jamel E Williams
(74) *Attorney, Agent, or Firm* — John A. Wilaj, Jr.

(57) ABSTRACT

A system and method for monitoring and predicting wear of a cutting tool used for machining a workpiece is disclosed. The system includes a cutting tool having a shank and a cutting head. The system also includes a split, modular and wireless wear detection system including one or more sensors mounted to the cutting tool for providing a data signal representative of a physical condition of the system, and a data recording and data transmitting device for recording the data signal from the one or more sensors and for generating and transmitting a data signal to a processor. The processor applies a machine learning data processing technique in real time to monitor and/or predict a condition of various components and/or parameters of the system during a metal cutting operation.

19 Claims, 5 Drawing Sheets

(56) References Cited

U.S. PATENT DOCUMENTS

| | | |
|---|---|---|
| 2016/0346890 A1 | 12/2016 | Dunkin |
| 2017/0008141 A1 | 1/2017 | Kluft |
| 2017/0209974 A1 | 7/2017 | Angel et al. |
| 2018/0147684 A1 | 5/2018 | Eriksson et al. |
| 2018/0178293 A1 | 6/2018 | Hashimoto et al. |
| 2018/0180522 A1 | 6/2018 | Lundgren et al. |
| 2018/0311779 A1 | 11/2018 | Keil et al. |
| 2019/0001456 A1 | 1/2019 | Kalhori et al. |
| 2019/0176286 A1 | 6/2019 | Chen et al. |
| 2020/0039027 A1 | 2/2020 | Goulet et al. |
| 2020/0230709 A1 | 7/2020 | Bjormander et al. |
| 2020/0238393 A1 | 7/2020 | Franca et al. |
| 2021/0114156 A1 | 4/2021 | Bleicher |

FOREIGN PATENT DOCUMENTS

| | | | |
|---|---|---|---|
| CN | 109175418 A | | 1/2019 |
| CN | 109175419 A | | 1/2019 |
| CN | 110788353 A | | 2/2020 |
| CN | 114102260 A | * | 3/2022 |
| CN | 114536104 A | * | 5/2022 |
| DE | 102018103599 A1 | * | 8/2018 ......... B23Q 17/0952 |
| DE | 102017110647 A1 | | 11/2018 |
| DE | 102019114887 A1 | | 12/2020 |
| EP | 3805880 A1 | | 4/2021 |
| EP | 3808503 A1 | | 4/2021 |
| JP | 2012020359 A2 | | 2/2012 |
| JP | 2017007029 A2 | | 1/2017 |
| JP | 2017140687 A2 | | 8/2017 |
| WO | WO-2015011489 A1 | * | 1/2015 ......... B23Q 17/0966 |
| WO | 2018095469 A1 | | 5/2018 |
| WO | 2018095472 A1 | | 5/2018 |
| WO | 2019002091 A1 | | 1/2019 |
| WO | 2020070907 A1 | | 4/2020 |
| WO | 2020171157 A1 | | 8/2020 |
| WO | 2020241628 A1 | | 12/2020 |

OTHER PUBLICATIONS

"Multiple sensor monitoring in nickel alloy turning for tool wear assessment via sensor fusion", Segreto et al., Procedia CIRP 12 (2013), pp. 85-90.

"Acoustic Emission Sensor", Type 8152C, Kistler Group, Switzerland, 2020, 7pages.

"Low Noise, High Frequency MEMS Accelerometers", ADXL1001/ADXL 1002, Data Sheet, Analog Devices, Norwood, MA, 14 pages.

"AE-C Acoustic Emission Sensor", Artis Marposs, Overview, www.marposs.com.

"Sensor fusion for online tool condition monitoring in milling", Wang et al., International Journal of Production Research, vol. 45, No. 21, Nov. 1, 2005, pp. 5095-5116.

* cited by examiner

SYSTEM AND METHOD FOR REAL-TIME MONITORING AND PREDICTING WEAR OF A CUTTING TOOL

FIELD OF THE DISCLOSURE

In general, the disclosure relates to cutting tools for performing machining operations on a workpiece. In particular, the disclosure relates to a system and method for monitoring and predicting cutting tool wear in real-time to utilize the useful life of the cutting tool, while preventing machine failure.

BACKGROUND OF THE DISCLOSURE

In the metal cutting processes, a cutting tool is used to shape a workpiece into a desired size and geometry. During this process, there will be wear developing at the cutting edge of the cutting tool. If the cutting edge is worn extensively, it will deteriorate the performance of the cutting tool and produce a poor-quality product and/or workpiece. In severe cases, it will lead to a catastrophic failure and potentially damage the machine. Therefore, to avoid these problems, the cutting tool is replaced periodically. Currently, replacement of the cutting tool is scheduled mostly based on past empirical data. However, replacement of the cutting tool on a scheduled basis based on empirical data may not reflect the actual wear and performance of the cutting tool. In other words, there may be cases that the life of the cutting tool is not fully utilized, or machine failure may still occur. Thus, it would be desirable to provide a system and method to fully utilize the useful life of the cutting tool, while avoiding machine failure.

SUMMARY OF THE DISCLOSURE

The problem of utilizing the useful life of the cutting tool, while avoiding machine failure, is solved by providing a system and method that monitors and predicts the wear of the cutting tool in real time with a split, modular, lightweight, and wireless design.

The system is equipped with one or more sensors to receive useful signals/data from cutting zone; a data logger and transmitter to record and communicate these data to a processor. Some typical sensors include vibration sensors, force sensors, strain sensors (including strain gage sensors), torque sensor, acoustic emissions, microphone, infrared sensor, thermal gauge, etc. The system further comprises one or more software algorithms/models to correlate these signals/data into tool wear, preferably through machine learning, including, but not limited to, transfer learning. The sensing unit is devised with both split and modular design, which can be placed close to the cutting zone; and can be plugged in/out from toolholders with standard connections points. The toolholders can be manufactured through additive manufacturing in order to fulfill lightweight, complex design with standard connection points with sensing units. For easy deployment and enhanced safety requirement, the hardware requires no external wires for powering and data communication. A method through wireless power transfer and/or battery is employed.

In one aspect, a system for monitoring and predicting wear of a cutting tool used for machining a workpiece comprises a cutting tool having a shank and a cutting head. The cutting head has an insert receiving pocket for receiving a cutting insert and a split, modular and wireless wear detection system comprising one or more sensors mounted to the cutting tool for generating a data signal, and a data recording and data transmitting device for recording the data signal from the one or more sensors and for generating and communicating a data signal to a processor. The processor applies a machine learning data processing technique in real time to monitor and/or predict a condition of various components and/or parameters of the system during a metal cutting operation.

BRIEF DESCRIPTION OF THE DRAWINGS

While various embodiments of the disclosure are illustrated, the particular embodiments shown should not be construed to limit the claims. It is anticipated that various changes and modifications may be made without departing from the scope of this disclosure.

DETAILED DESCRIPTION OF THE DISCLOSURE

Figure 1:
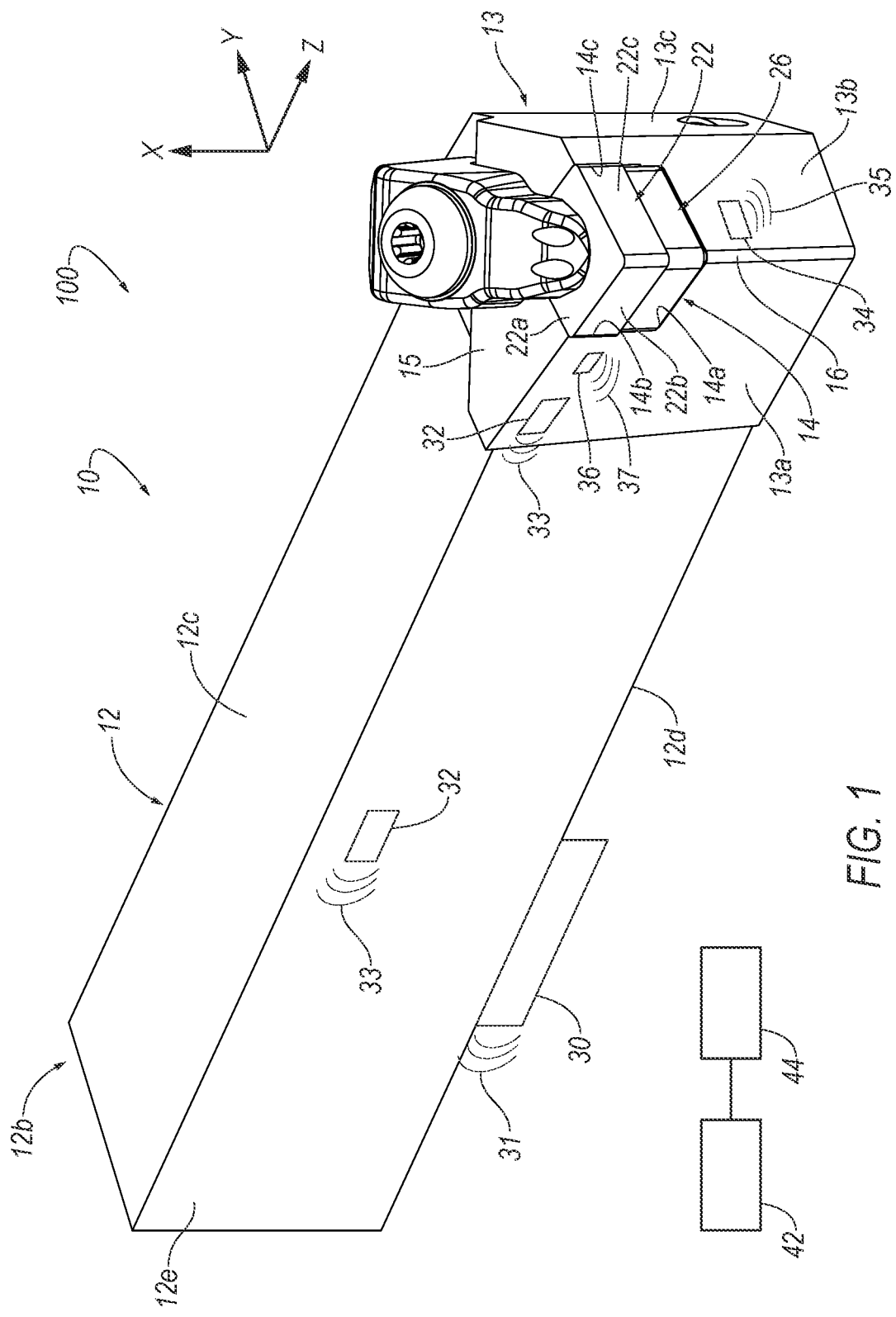
FIG. 1 is a front perspective view of a system for real-time monitoring and predicting wear of a cutting tool, such as a turning toolholder, according to an embodiment of the disclosure.
Figure 2:
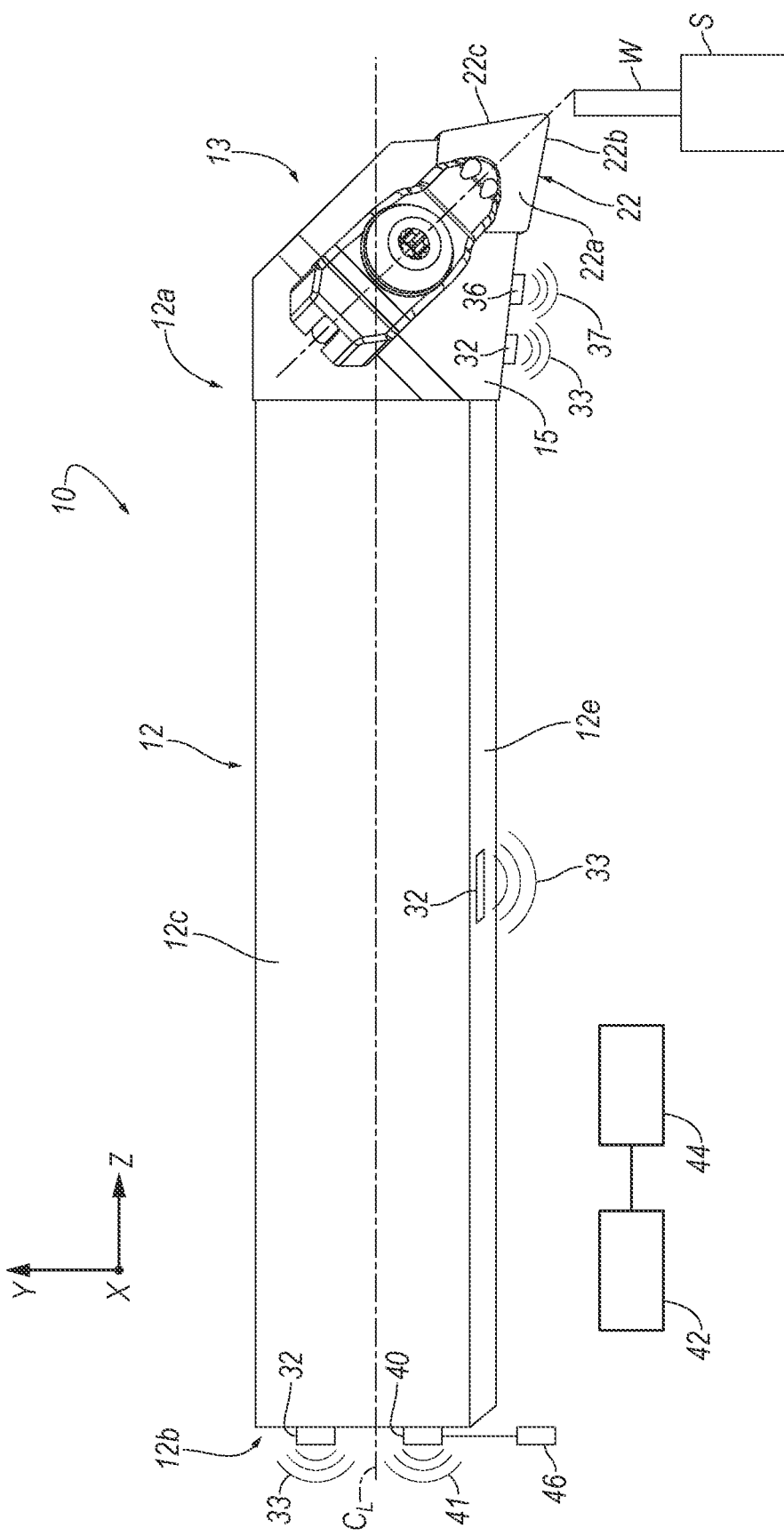
FIG. 2 is top view of the system of FIG. 1.

Referring now to FIGS. 1 and 2, a system 100 for real-time monitoring and predicting wear of a cutting tool, such as a turning toolholder 10, is shown according to an embodiment of the disclosure. As is known in the art, the turning toolholder 10 performs a turning metal cutting operation on a workpiece, W, rotated by a spindle, S. The turning toolholder 10 comprises a shank 12 with an axially forward end 12*a*, an axially rearward end 12*b* and a central, longitudinal axis, $C_L$. The shank 12 is generally rectangular in shape having a top surface 12*c*, a bottom surface 12*d* opposite the top surface 12*c* and side surfaces 12*e* extending between the top surface 12*c* and the bottom surface 12*d*. A cutting head 13 extends from the axially forward end 12*a* of the shank 12 and has an insert-receiving pocket 14 formed at an outermost corner 16 at the intersection of two side surfaces 13*a*, 13*b* of the cutting head 13. In the illustrated embodiment, the shank 12 and the cutting head 13 are integrally formed and can be made of tool steel, and the like. The insert-receiving pocket 14 has a bottom surface 14*a* and a pair of side walls 14*b*, 14*c*. The insert-receiving pocket 14 is formed in a top surface 15 of the cutting head 13. It should be appreciated that the principles of the invention is not limited to a turning toolholder, and that the principles of the invention can be practiced with any type of toolholder.

As used herein, directional phrases, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

A cutting insert 22 is disposed on an optional seat member 26. It will be appreciated that the invention is not limited by the type and shape of the cutting insert 22, and that the invention can be practiced with any desirable shape and type of insert. For example, when the cutting insert 22 is triangular in shape, rather than square or rectangular, the receiving pocket 14 can also be triangular in shape to accommodate the shape of the cutting insert 22. Although the cutting insert 22 can be any shape, the illustrated cutting insert 22 is generally diamond in shape having a top rake surface 22a and at least two side flank surfaces 22b, 22c. It should be understood that two side flank surfaces 22b, 22c contact two of the side walls 14b, 14c of the insert-receiving pocket 14 when the cutting insert 22 is properly mounted in the pocket 14. As a result, three-point contact exists (bottom surface and two flank surfaces of the cutting insert 22 contact the optional seat member 26 or the bottom surface 14a and the two side walls 14b, 14c of the pocket 14) when the cutting insert 22 is properly mounted within the pocket 14.

As mentioned above, one aspect of the disclosure is that the toolholder 10 includes a split, modular and wireless wear monitoring and prediction detection system.

The split, modular and wireless wear detection system comprises two basic components as follows:

(1) a sensor, a sensor element, a sensor assembly or like comparable device for emitting a data signal representative of cutting force (x, y, z), tool vibration (x, y, z), spindle vibration (x, y, z) and acoustic emission (AE). Some typical types of sensors or sensing elements include, but is not limited to, a vibration sensor, a force sensor, a strain sensor (including strain gage sensors), a torque sensor, an acoustic emission sensor, a microphone, an infrared sensor, a thermal gauge, and the like; and (2) a data recording and data transmitting device for recording the data signal from the sensor element and for wirelessly communicating a signal to a processor and/or a display device. Alternatively, the data recording and data transmitting device may communicate the signal to the processor by means of a hard-wired connection, rather than wirelessly communicating the data signal.

In the illustrated embodiment, a plurality of different types of sensors or sensing elements are used in the split, modular and wireless wear detection system to provide the data signal to the data recording and data transmitting device. It will be appreciated that the invention is not limited by the number or type of sensors, and that the invention can be used with any number and type of sensors, depending on the amount and type of data necessary for practicing the principles of the invention. Ideally, the system 100 should include a large number of sensors or sensing elements located in close proximity to the insert-receiving pocket 14 (i.e., cutting zone) of the toolholder. The closer to the cutting zone, the more sensitive signals that the sensor or sensing element is able to pick up.

One type of sensor 30 comprises a force dynamometer, commercially available from Kistler Instrument Corporation, Novi, Michigan as Product Type 9129AA (https://ww.kistler.com/en/product/type-912 aa/). The purpose of the force dynamometer 30 is to provide a data signal 31 representative of the cutting force in three-dimensions (x, y, z) exerted on the toolholder 10 and the cutting insert 22 during the metal cutting operation. In the illustrated embodiment, the force dynamometer 30 is located on the bottom surface 12d of the shank 12. However, it will be appreciated that the force dynamometer 30 can be located at any other desired location, such as the top surface 12c of the shank 12, on the cutting head 13, and the like.

Another type of sensor 32 comprises an accelerometer, commercially available from Dytran Instruments, Inc., Chatsworth, California as 3273 Series (https://www.dytran.com/Model-3273A1-Triaxial-Accelerometer-P2429/). The accelerometer 32 is also commercially available from Digi-Key Electronics, Thief River Falls, Minnesota as Part No. EVAL-ADXL1001Z-ND (https://www.digikey.com/en/products/detail/analog-devices-inc/EVAL-ADXL1001Z/7200821). The purpose of the accelerometer 32 is to provide a data signal 33 representative of the amount of vibration in three-dimensions (x, y, z) experienced by the toolholder 10. In the illustrated embodiment, the toolholder 10 has a first accelerometer located on the cutting head 13 and in close proximity to the insert-receiving pocket 14 of the toolholder 10, a second accelerometer located on the side surface 12*e* of the shank 12, and a third accelerometer located on the rearward end 12*b* of the shank 12.

Yet another type of sensor 34 comprises a strain gage, commercially available from Techni Measure, Auckley, Doncaster, United Kingdom as Part No. GFLA-3-350-70 (https://store.technimeasure.co.uk/product/gfla-3-350-70/). The strain gage 34 is located in close proximity to the insert-receiving pocket 14 of the toolholder 10. The purpose of the strain gage 34 is to provide a data signal 35 representative of the amount of strain experienced by the toolholder 10.

Still yet another type of sensor 36 comprises an acoustic emission (AE) sensor commercially available from Kistler Instrument Corporation, Novi, Michigan as Product Type 8152Cxyy00xx (https://ww.kistler.com/files/document/003-120e.pdf). The acoustic emission sensor 36 measures high-frequency energy signals that are generated during material removal from the workpiece, W, and the toolholder 10 during a metal cutting operation. Acoustic emissions (i.e., structural noise) are inaudible ultrasonic signals. The purpose of the acoustic emission sensor 36 is to provide a data signal 37 representative of small deviations in cutting forces exerted by the cutting insert 14 on the workpiece, W, during a metal cutting operation. In the illustrated embodiment, the acoustic emission sensor 36 is located on the cutting head 13 and in close proximity to the cutting insert 14 of the toolholder 10.

A data recording and data transmitting device 40 is configured to receive and store the data signals 31, 33, 35, 37 from the one or more sensor elements 30, 32, 34, 36, respectively. In one embodiment, the data recording and data transmitting device 40 is mounted on the rearward end 12*b* of the shank 12, as shown in FIG. 2. In another embodiment, the data recording and data transmitting device 40 is not mounted on the shank 12 at all. In yet another embodiment, the data recording and data transmitting device 40 is integrated with one or more sensor elements 30, 32, 34, 36.

The data recording and data transmitting device 40 wirelessly communicates the signal 41 to a processor 42 and/or display device 44, as shown in FIG. 2. The processor 42 and/or display device 44 acts as a means for processing and displaying analysis of the data signals 31, 33, 35, 37 from the one or more sensor elements 30, 32, 34, 36. The processor 42 and/or display device 44 can be any suitable type of computer, tablet or general processing device. The data recording and data transmitting device 40 can, in some embodiments, include a base station or other relay point (not shown) that may initially receive sensor data and then relay/transmit the same to the processor 42 and/or display device 44 via a wireless connection.

As is known in the art, a power source 46, such as a battery, and the like, can be in electrical communication with and provides power to the one or more sensor elements 30, 32, 34, 36 and the data recording and data transmitting device 40. Ideally, the power source 46 is located in close proximity to the one or more sensor elements 30, 32, 34, 36 and/or the data recording and data transmitting device 40.

Figure 3:
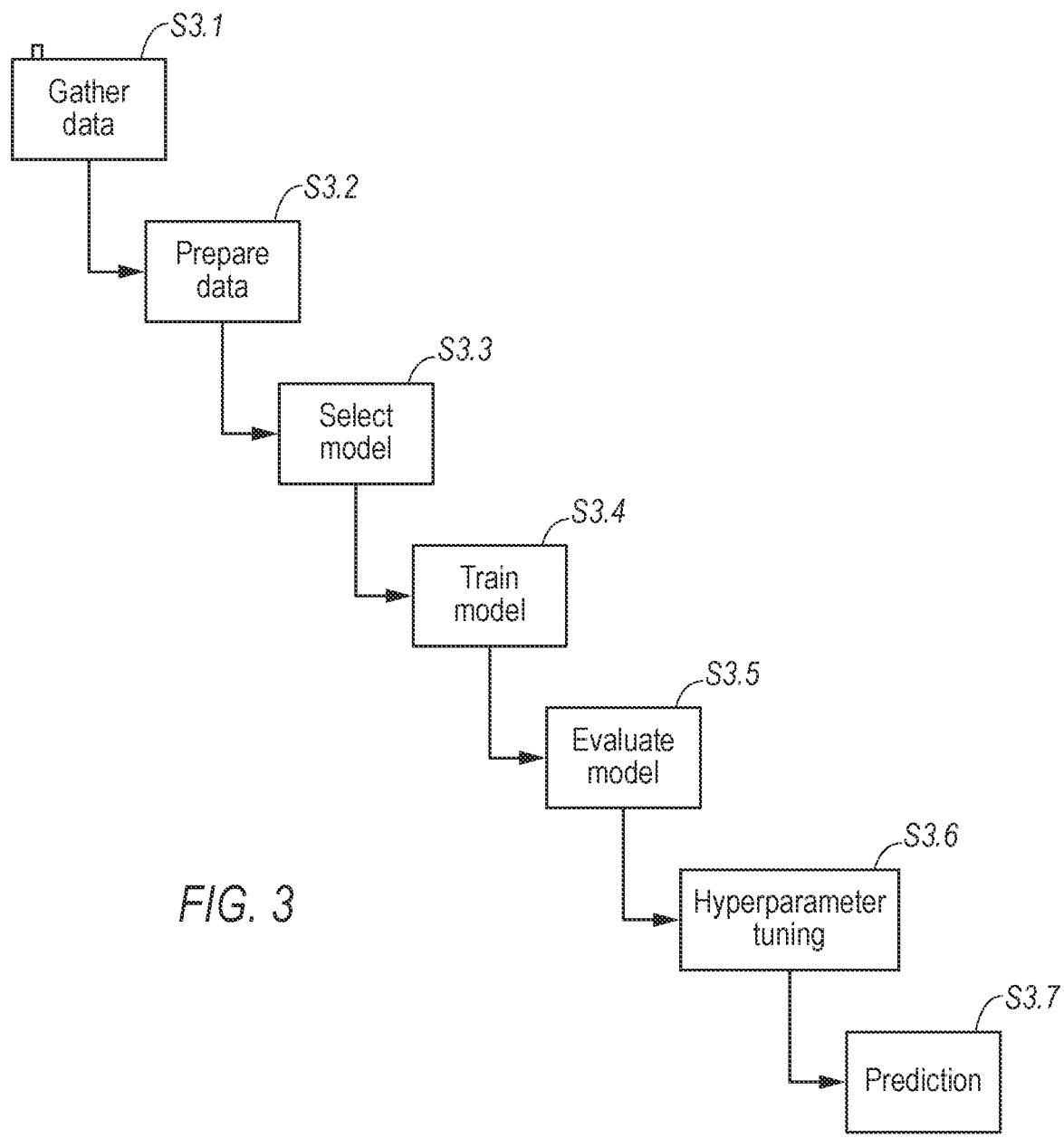
FIG. 3 is a flowchart of a method of a seven step machine learning process for monitoring and predicting wear of the cutting tool according to the method of the disclosure.
Figure 4:
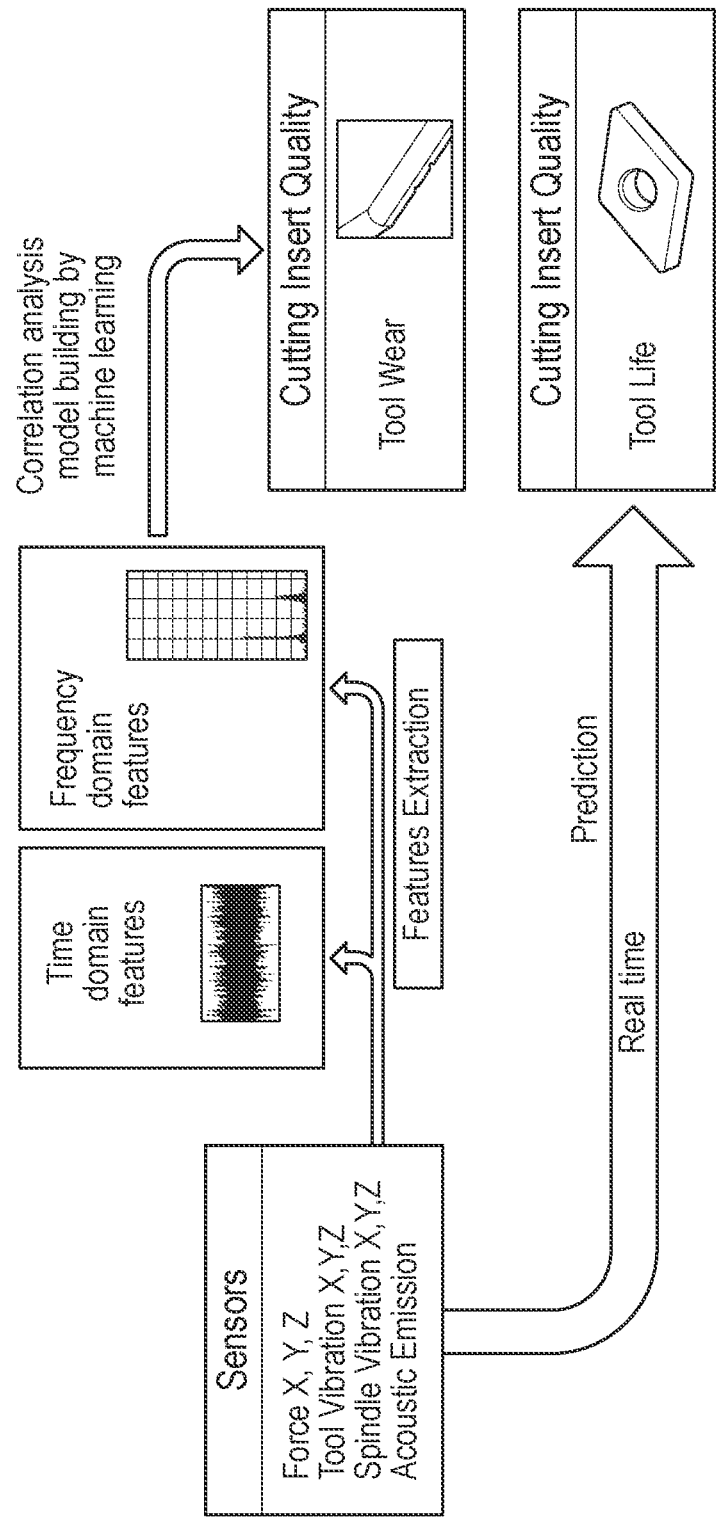
FIG. 4 is a graphic representation in which features extraction from sensor data is correlated using a machine learning process to determine wear of the cutting tool and predict cutting tool life in real time according to the method of the disclosure.
Figure 5:
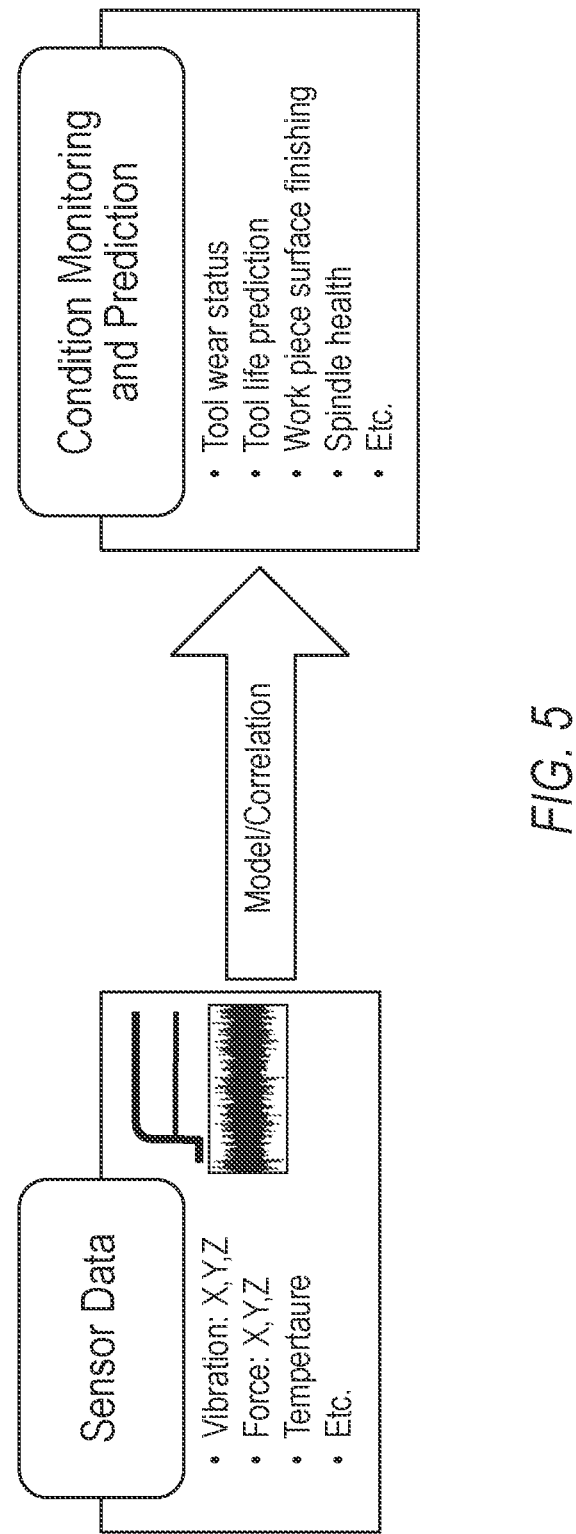
FIG. 5 is another graphic representation in which sensor data is correlated in a model to monitor and predict tool wear status, tool life, workpiece surface finish, spindle health, and the like, according to the method of the disclosure.

Referring now to FIGS. 3-5, the method of the invention uses the data signals 41 sent to the processor 42 and a machine learning data processing technique such as supervised neural network (NN) is performed by the processor 42 in real time to monitor and/or predict the condition of various components and/or parameters of the toolholder 10 during a metal cutting operation, as shown in FIGS. 4 and 5. These conditions include, but are not limited to, cutting insert wear, tool life, surface finish of the workpiece, W, health of the spindle, S, and the like.

Referring now to FIG. 3, the machine learning data processing technique comprises a seven-step process. In general, the seven-step machine learning process comprises: 1) gathering data; 2) data preparation; 3) choosing a model; 4) training; 5) evaluation; 6) hyperparameter tuning; and 7) prediction.

In the first step, data is gathered from the data signals 41 from the data recording and data transmitting device 40 and pre-processed to filter out signal segments that do not correspond to the regime machining conditions under examination in a procedure called signal segmentation in Step S3.1. Typically, the initial and final parts of the data signal 41 are related to transient machining conditions and should be eliminated to remove misleading information.

Next, the data is prepared in Step S3.2 by extraction of features through various signal processing techniques to construct feature (e.g., time domain features and frequency domain features) from each of the data signals 41 from the data recording and data transmitting device 40. In one embodiment, for example, feature extraction is implemented through the application of Durbin's algorithm with p=4. Thus, the feature vector extracted from each data signal 41 is a 4-elements vector.

In Step S3.2, optionally, a sensor fusion pattern recognition algorithm based on neural network data processing is implemented by the processor 42 by combining the feature vectors extracted from the data signals 41. In particular, the fusion of the data signals 41 can be performed by integrating at least two of the data signals 31, 33, 35, 37, for example, cutting force and acoustic emission (AE) (i.e., data signals 31 and 37, acceleration and AE (i.e., data signals 33 or 35 and 37. Alternatively, the fusion of the data signals 31, 33, 35, 37 may be performed by integrating all the data signals (i.e., data signals 31, 33, 35 and 37).

Next, a model is selected is Step S3.3. There are several models that can be chosen, depending on the type of data to be processed, such as images, sound, text, and numerical data. For example, a Bayesian Classifier may be used for spam and noise filtering type of data.

Then, the chosen model is trained in Step S3.4. Training the chosen model is probably the most important step in the machine learning process. In this step, the data signals 41 from the data recording and data transmitting device 40 are used to incrementally improve the chosen model's ability to predict. Random values in the model are initialized and the output of the model using the data signals 41 is predicted. These predicted outputs are then compared with the training set and then the values in the models are adjusted so as to match the predictions made by the chosen model with the training set. This step is repeated as necessary.

Once the training is complete in Step S3.4, the chosen model is tested against the data signals 41 that has not been used for training to evaluate how the chosen model might perform in real world situations in Step S3.5.

Once the evaluation is completed in Step S3.5, further improvements in the model can be made in Step S3.6. The parameters that improve the model are known as hyperparameters. The adjustments or tuning of the chosen model depend on the dataset, model and the training process. One way of improving the chosen model is to revisit the training Step S3.4. Another way is to reprepare the data and select more sensitive feature/features given to the model in Step S3.2. Another way is to select a different machine learning model in Step S3.3

Once the adjustment or tuning of the hyperparameters is completed in Step S3.6, then the machine learning can use the data signals 41 from the data recording and data transmitting device 40 to predict the tool life of the cutting insert 22 in real time in Step S3.7.

As shown in FIG. 5, the system and method of the invention comprises software algorithm/models to correlate the signals/data from the sensors into tool wear, tool life, workpiece surface finish, spindle health, and the like, preferably through machine learning, including transfer learning. The system is provided with both split and modular design, which can be placed close to the cutting zone; and can be plugged in/out from the toolholder with standard connections points. The toolholder can be manufactured through additive manufacturing in order to provide a lightweight, complex design with standard connection points with the sensors. For easy deployment and enhanced safety, the sensors can be provided such that no external wires are required for powering and data communications.

The system and method of the invention has the following technical advantages:

1. A Unique Split Design that Allows a Close Deployment into the Cutting Zone.

The sensing unit of this system employs a unique split two-part design: a front-end "probe" and a back-end "base". The "probe" part is composed of only sensors, which make it smaller in size and can be placed close to the cutting zone to receive signals. The closer the "probe" or sensor is to the cutting zone, the more sensitive the signals would be. This improves the tool wear monitoring and prediction accuracy for the system 100. The "base" part is composed of data logger, transmitter, power units, and the like. This is placed further away from cutting zone where the space is not a restriction.

2. A Modular Design for Easy Plug-In/Out, which can be Applied at Multiple User Cases.

The sensing unit come with a modular design, in which they have standard size and connection points. These enable them to be easily mounted onto toolholders. This allows deployments of this system into different metal cutting systems and scenarios, which broaden the user cases.

3. Lightweight Toolholders with Standard Connections and Complementary Structures.

The toolholders are manufactured with standard connection points to the sensing units. In addition, these toolholders have complementary structures to better host the "probe" and "base". This allows easy replacements and secure connections. Additive manufacturing (i.e., 3D printing) is used to achieve lightweight and complex structures.

4. Fully Wireless Systems which Require No External Connections.

This system will utilize novel wireless power system such as radio frequency to power up the entire system. Alternatively, long lasting battery are used. Wireless data communication is equipped so that the whole system can be cableless. This allows easy deployment in the manufacturing sites with safety compliance.

5. Real Time Tool Wear Monitoring and Prediction with High Accuracy and Wide Usability.

Through the unique split, modular, lightweight, and wireless design, the system and method of the invention is able to receive much sensitive and useful signal. These signals/data are wireless transmitted to a computing unit. Software algorithm/models in this computing unit are able to correlate these signals/data into tool wear at real time, preferably through a machine learning processing technique. Through data training, a chosen model has the ability to obtain high accuracy and wide scenarios, for example, with different machines, workpieces, cutting tools, cutting parameters, dry/wet cuts, and the like.

Having described presently preferred embodiments the disclosure may be otherwise embodied within the scope of the appended claims.

What is claimed is:

1. A system for monitoring and predicting wear of a cutting tool used for machining a workpiece, comprising:
   a cutting tool having a shank and a cutting head, the cutting head having an insert receiving pocket for receiving a cutting insert; and
   a split, modular and wireless wear detection system comprising:
      one or more sensors mounted to the cutting tool for generating a data signal;
      a data recording and data transmitting device for receiving and recording the data signal generated by the one or more sensors and for generating and transmitting a data signal to a processor,
   wherein the processor applies a machine learning data processing technique in real time to monitor and/or predict a condition of various components and/or parameters of the system during a metal cutting operation; and
   wherein the machine learning data processing technique is based on a sensor fusion pattern recognition algorithm by combining feature extracted from the data signals generated by the data recording and data transmitting device.

2. The system of claim 1, wherein the machine learning data processing technique comprises a seven-step machine learning process.

3. The system of claim 2, wherein the seven-step machining learning processing technique comprises: 1) gathering data; 2) data preparation; 3) choosing a model; 4) training; 5) evaluation; 6) hyperparameter tuning; and 7) prediction.

4. The system of claim 3, wherein gathering data of the seven-step machining learning processing technique comprises gathering data signals from the data recording and data transmitting device and pre-processing to filter out signal segments that do not correspond to machining conditions under examination in a procedure called signal segmentation.

5. The system of claim 3, wherein data preparation of the seven-step machining learning processing technique comprises extraction of features to construct feature from each of the data signals from the data recording and data transmitting device.

6. The system of claim 3, wherein training of the seven-step machining learning processing technique comprises initializing random values in the model for the data signals from the data recording and data transmitting device, predicting an output for the data signals, comparing the output with training set, and then adjusting the random values so as to match the output predicted by the chosen model to the training set.

7. The system of claim 1, the condition of various components and/or parameters of the system comprises one of cutting insert wear, cutting tool life, surface finish of a workpiece, W, and health of a spindle, S.

8. The system of claim 1, wherein the one or more sensors comprise one of a force sensor, a vibration sensor, a strain gage and an acoustic emission sensor, a torque sensor, a microphone, an infrared sensor, a thermal gauge.

9. The system of claim 1, wherein the one or more sensors transmits the data signal to the data recording and data transmitting device.

10. The system of claim 1, wherein the data recording and data transmitting device wirelessly transmits the data signal to the processor.

11. The system of claim 1, wherein the cutting tool comprises a turning toolholder.

12. A system for monitoring and predicting wear of a cutting tool used for machining a workpiece, comprising:
a cutting tool having a shank and a cutting head, the cutting head having an insert receiving pocket for receiving a cutting insert; and
a split, modular and wireless wear detection system comprising:
one or more sensors mounted to the cutting tool for generating a data signal;
a data recording and data transmitting device for receiving and recording the data signal generated by the one or more sensors and for generating and transmitting a data signal to a processor,
wherein the processor applies a machine learning data processing technique in real time to monitor and/or predict a condition of various components and/or parameters of the system during a metal cutting operation;
wherein the machine learning data processing technique comprises a seven-step machine learning process; and
wherein the seven-step machining learning processing technique comprises: 1) gathering data; 2) data preparation; 3) choosing a model; 4) training; 5) evaluation; 6) hyperparameter tuning; and 7) prediction.

13. The system of claim 12, wherein gathering data of the seven-step machining learning processing technique comprises gathering data signals from the data recording and data transmitting device and pre-processing to filter out signal segments that do not correspond to machining conditions under examination in a procedure called signal segmentation.

14. The system of claim 12, wherein data preparation of the seven-step machining learning processing technique comprises extraction of features to construct feature from each of the data signals from the data recording and data transmitting device.

15. The system of claim 12, wherein training of the seven-step machining learning processing technique comprises initializing random values in the model for the data signals from the data recording and data transmitting device, predicting an output for the data signals, comparing the output with training set, and then adjusting the random values so as to match the output predicted by the chosen model to the training set.

16. The system of claim 12, the condition of various components and/or parameters of the system comprises one of cutting insert wear, cutting tool life, surface finish of a workpiece, W, and health of a spindle, S.

17. The system of claim 12, wherein the one or more sensors comprise one of a force sensor, a vibration sensor, a strain gage and an acoustic emission sensor, a torque sensor, a microphone, an infrared sensor, a thermal gauge.

18. The system of claim 12, wherein the one or more sensors transmits the data signal to the data recording and data transmitting device.

19. The system of claim 12, wherein the data recording and data transmitting device wirelessly transmits the data signal to the processor.

* * * * *